3,705,237
ANTIBIOTIC SUBSTANCE AND PROCESS FOR THE EXTRACTION OF SUCH AN ANTIBIOTIC SUBSTANCE FROM A NEW STRAIN OF PSEUDOMONAS

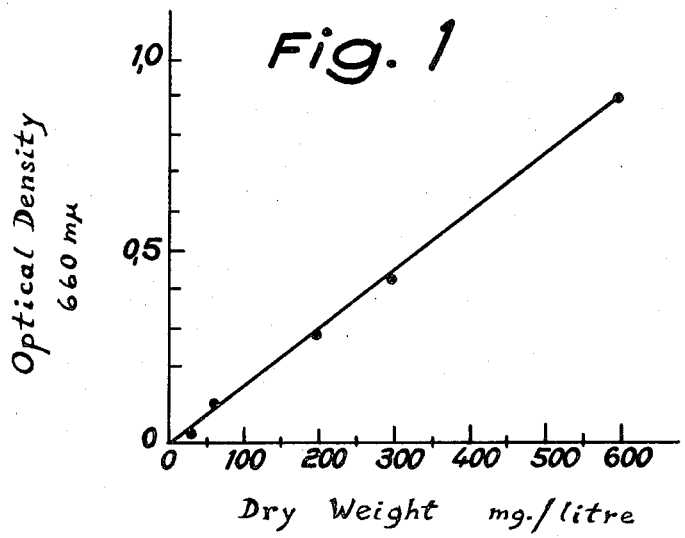
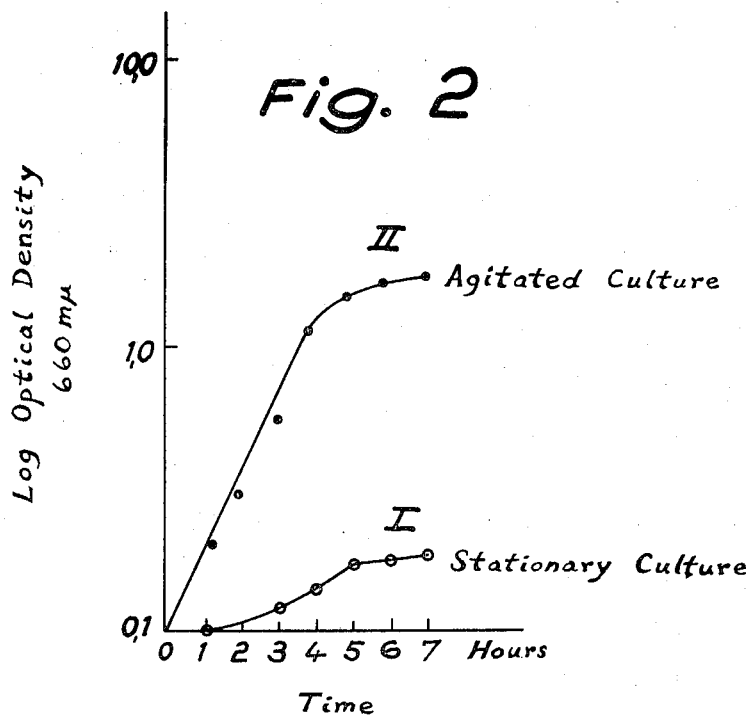

Robert Grandpierre, Bourg-la-Reine, and Alexandre Robert, Albon, France, assignors to Albert Rolland S.A., Paris, France
Filed July 17, 1970, Ser. No. 55,785
Int. Cl. C12d 9/20
U.S. Cl. 424—115                                  12 Claims

ABSTRACT OF THE DISCLOSURE

An antibiotic, active against gram positive and gram negative organisms, is obtained from a new strain, *Pseudomonas rollandi* CBS 368.68 which has been cultured aerobically at 12–42° C. for a sufficient time to achieve the stationary growth phase. The resulting Pseudomonas is ground and dehydrated and the antibiotic extracted with methanol.

---

Figure 3:
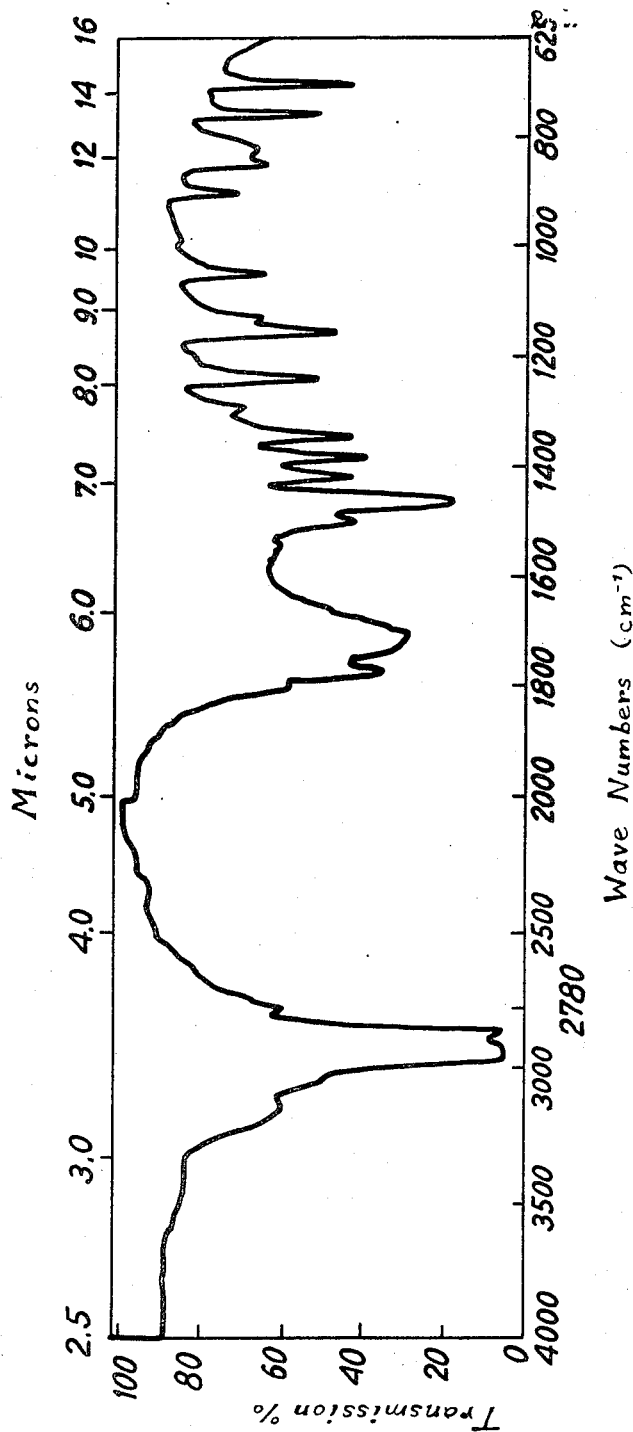

The present invention relates to a new antibiotic substance capable of inhibiting the growth of certain pathogenic organisms which have been extracted from microorganisms originating from muds known by the name of "Baregines," collected at the spa of Luchon (France).

By taking a sample directly from the "Baregines," we have isolated a strain of micro-organism and identified it in accordance with the identification criteria indicated in "Bergey's Manual of Determinative Bacteriology."

By carrying out the tests described below, it can be shown that the new strain must be classified in order I, Pseudomonadales, Family IV, Pseudomonadacae, Genus I, Pseudomonas, as a new species.

Comparison of the total properties of the new strain with those attributed to the hundred and forty-nine species of Pseudomonas described in Bergey made it possible to establish that the new strain must be close to *Pseudomonas fairmontensis* with which it shows most characteristics in common. However, as indicated below, the strain used in this invention differs from *Pseudomonas fairmontensis* and even more so from the other species of Pseudomonas in respect of certain of its properties and must therefore be considered to be an entirely new strain.

We have given the new strain the name of *"Pseudomonas rollandi"* and deposited a sample in the collection of micro-organisms of the Centraal Bureau voor Schimmelcultures in Baarn (Holland), where it has been given the number CBS 368.68.

The identification of the new strain was based on the following observations: the new strain grows satisfactorily in ordinary culture media, such as nutrient broth, nutrient agar and also in certain special media, such as the medium containing sulphur, aqueous peptone and similar media. It devolops within very wide temperature limits, varying approximately from 12° C. to 42° C.

On agar, the strain forms white colonies of a glossy translucent appearance, becoming continuously confluent in a few days. The edges of the colonies are regular and slightly domed. In nutrient broth, the formation of a green fluorescent water-soluble pigment, which is insoluble in chloroform, is occasionally observed.

On microscopic examination, it is observed that these colonies consist of short rods with rounded ends, which are very mobile. The strain of the cilia, according to the Leifson method shows that the new strain is polar monotrichous (single haired).

The characteristic culture properties and morphology of the new strain are given in Table I below:

TABLE I

| | |
|---|---|
| Gram strain | Gram-negative. |
| Mobility | Very mobile. |
| Morphology | Small rods. |
| Colonies | White, glossy, regular edges. |
| Nutrient agar | Variable fluorescence. |
| Nutrient broth | Green, homogeneous, cloudy velum precipitate. |
| Peptonised water | Velum at the surface, cloudy, precipitate. Salkowsky reaction: indole. |
| Litmus milk | Coagulated in 24 hours, digested in 3 days, acidified pH 5.0. |
| Litmus whey | Alkaline after 18 hours. |
| Deep VF agar | Strict aerobic growth. |
| Potato | Beige colonies. |
| Urea-indole | After 2 hours' incubation, turning to violet-red: +. Ureas: +. Test for tryptophane-deaminase indolacetic acid: +. |
| Lactose-glucose-$H_2S$ | Black colonies on the slope (48 hours). Gas −. Glucose −. Lactose −. Lysine-decarboxylase −. $H_2S$ +. |
| Agar-under lead acetate | $H_2S$ ±. |
| Citrate | +. |
| Nitrate-nitrites | −. |
| Clark and Lubs | −. |
| Gelatine | Cylindrical liquefaction. |
| Fermentation of carbohydrates: | |
| Starch | −. |
| Arabinose | −. |
| Galactose | ±. |
| Glucose | +. |
| Lactose | −. |
| Laevulose | ±. |
| Maltose | −. |
| Mannitol | −. |
| Sucrose | −. |
| Xyloso | −. |

The comparative tests above show that the new strain differs from *Pseudomonas aeruginose* (or from *Pseudomonas pyocyanea* or *B. pyocyaneus*) in respect of its cultures on potato (beige colonies on a light background; the species Pyocyanea gives deep chestnut-coloured colonies, with the potato being green in colour); in respect of the acidification of milk (the species Aeruginosa turns milk alkaline). The species Pyocyanea is optionally aerobic, whilst the new strain is strictly aerobic; the former does not ferment glucose whilst the new strain ferments glucose. *Pseudomonas fairmontensis* no longer grows at 35° C., *Pseudomonas boreopolis* no longer grows at 35–37° C., whilst the new strain still grows at 42° C. *Pseudomonas fairmontensis* is optionally aerobic, whilst the new strain is strictly aerobic. *Pseudomonas effusa* also renders litmus milk alkaline and is optionally aerobic. The other known species of Pseudomonas are all even more differentiated from our new strain.

Our new strain has also been identified in accordance with the taxonomic system of Stanier, Palleroni and Doudoroff. The characteristic and morphological properties of the new strain under this system are given in Table II below:

TABLE II

| | |
|---|---|
| Optical microscopy: | |
| Morphology | Small rod. |
| Mobility | Very mobile. |
| Gram strain | Gram-negative. |
| Flagellae | Polar monotrichous. |
| Culture: | |
| Nutrient broth | Green, velum, homogeneous cloudiness, precipitate. |
| Nutrient agar | Green, fluorescence (pyoverdine). |
| King medium | Deep blue after 24 hours at 37° C. (pyocyanine). |
| Deep agar | Strictly aerobic. |
| Aerobic broth, without source of nitrate. | Does not grow. |
| Aerobic broth, with source of nitrate. | Grows, production of gas, strictly aerobic denitrification. |
| Succinate | Grows ++. |
| Para-hydroxybenzoate | Grows +. |
| Shikimate | Do. |
| Adipate | Do. |
| Tryptophane | Do. |
| Leucine | Do. |
| C-C muconate | Mutants. |
| Comparison (without source of carbon). | Does not grow ⊖. |
| Fucose | Do. |
| Maleate | Do. |
| Threonine | Do. |
| Catechol | Do. |
| Phenol | Do. |
| m-Hydroxybenzoate | Do. |

From all the characteristics set out above, it is concluded that, in this taxonomic system, the new strain belongs to the Genus Pseudomonas, species *aeruginosa*.

The present invention provides a process for obtaining an antibiotic wherein a strain of *Pseudomonas rollandi* No. CBS 368.68 is cultured aerobically, at 12–42° C., preferably at 28–37° C., in a conventional culture medium, such as a nutrient broth, for a sufficient period to achieve the stationary growth phase of the Pseudomonas and the resulting Pseudomonas is then separated off, preferably by centrifuging or ultrafiltration; the separated Pseudomonas is then ground, preferably by means of ultrasonics, the resulting ground material is dehydrated, preferably by lyophilisation, and the anhydrous ground material is finally extracted with methanol. The methanol solution containing the antibiotic may be evaporated to dryness to give the antibiotic as a solid which may be subjected to further purification.

This further purification may comprise:

(a) Extraction with a chlorinated solvent, especially chloroform, methylene chloride or trichloracetic acid, followed by or preceded by treatment with hexane or heptane to remove lipids, and (b) If desired, extraction of the product from step (a) with ethanol to give the antibiotic in a purified state.

The following examples are given to illustrate the invention.

EXAMPLE 1

Culture of *Pseudomonas rollandi*

(I) Production of *Pseudomonas rollandi* by stationary culture.—250 ml. of nutrient broth per flask are introduced into Roux flasks of 1 litre capacity under sterile conditions. The nutrient broth of the Institut Pasteur was used. This broth is inoculated, using a Pasteur pipette, with a 12 hour culture of *Pseudomonas rollandi* CBS 368.68 in a nutrient broth. The Roux flasks are placed flat in the oven so as to achieve a large contact area between the air and the broth. The cultures are incubated at 37° C. for one week.

At the end of the incubation period, the greater part of the velums formed is collected by centrifuging and the remainder of the micro-organisms is collected by ultrafiltration on a Millipore membrane of average pore diameter 0.45 m$\mu$.

(II) Production of *Pseudomonas rollandi* by stirred culture.—1 litre of culture medium of the follow composition:

| | G. |
|---|---|
| Difco Bacto nutrient broth | 8 |
| Difco yeast extract | 5 |
| $H_2O$, to 1000 ml. | | is inoculated with a suspension of *Pseudomonas rollandi* CBS 368.68 originating from a 12 hour culture at 28° C. on Pasteur nutrient agar. The medium is kept stirred at 28° C. overnight.

The following day, 10 litres of culture medium are inoculated with the pre-culture at the rate of 100 ml. of pre-culture per flask containing 1 litre of medium. The flasks are shaken in an oven at a temperature of 28° C. for 7 hours, the time required for the culture to reach the stationary growth phase.

The combined cultures are then centrifuged on a cool Sharples centrifuge at 35,000 revolutions per minute, the cake collected, washed in an 0.02 M phosphate buffer and then centrifuged cold at 15,000 revolutions per minute for 20 minutes.

The graph in FIG. 1 of the drawings shows, as abscissae, the dry weight (in mg./litre) of *Pseudomonas rollandi* present in the culture medium as a function of the turbidity, expressed as the optical density, as ordinates, of the medium, read off on a spectrophotometer at a wavelength of 660 m$\mu$. Thus, for example, it can be seen that for the given strain and for the given experimental conditions, 1 litre of culture of optical density 0.5 contains about 325 mg. dry weight of bacteria.

The graph in FIG. 2 of the drawings shows the growth curve of *Pseudomonas rollandi* as a function of the time in hours, as the abscissae, and the logarithm of the optical densities, as ordinates. The exponential growth phase expresses itself as a straight line. The generation time is the time required to double the optical density in the rectilinear part (exponential part of the growth curve). Under the experimental conditions presented below, the generation time is 60 minutes.

Furthermore, it can be seen from FIG. 2 that the growth of the bacteria is markedly more rapid in shaken culture (curve II) than in stationary culture (curve I). This is in agreement with the aerobic nature of *Pseudomonas rollandi*.

EXAMPLE 2

(A) Extraction of the new antibiotic

The micro-organisms collected by centrifuging or ultrafiltration of the culture from Example 1 are ground by ultrasonics. The homogeneous liquid obtained after treatment with ultrasonics is lyophilised and the lyophilised product is powdered in a mortar, weighed and stored.

140 g. of the resulting powder are introduced into cellulose thimbles and place in a Soxhlet apparatus. The powder is extracted with 5 litres of methanol under reflux for 1 hour.

The methanol solution is then evaporated to dryness to give 63 g. of a methanolic extract containing the entire antibiotic activity of the starting powder. The inactive residue is discarded. This methanolic extract forms the crude antibiotic substance.

(B) Purification of the methanolic extract by functional precipitation

The methanolic extract is treated three times with 300 ml. of boiling chloroform for 5 minutes. The chloroform extract, which contains the antibiotic activity, is evaporated to dryness and then treated with boiling hexane to remove the lipids. The residue (3.4 g.), which contains the antibiotic activity, is designated extract I (semi-purified antibiotic).

This extract I is then treated with acetone to give a fraction $I_1$ consisting of the active residue (1.1 g.) and a fraction $I_2$ consisting of the active extract (1.9 g.).

Fraction $I_1$, after extraction with anhydrous ethanol, gives an inactive residue (0.7 g.) and a very active extract which is evaporated to dryness to yield fraction $I_{11}$ (0.35 g.).

Fraction $I_2$, evaporated to dryness, is extracted with anhydrous ethanol to give an inactive residue (0.15 g.) and a very active extract which is evaporated to dryness to give fraction $I_{22}$ (1.7 g.).

Fractions $I_{11}$ and $I_{22}$ constitute the antibiotic in the purified state.

In order to characterise the purified antibiotic, fraction $I_{22}$ was extracted with chloroform to give an inactive residue and a very active extract which is evaporated to dryness (1.3 g.). This extract, when dissolved in 10 ml. of ethyl acetate, precipitates crystals which are filtered off to give a crystalline fraction $I_3$ (0.13 g.). The mother liquors are evaporated to dryness, the residue is taken up in ethyl acetate and the soluble portion is treated with 0.5 N aqueous sodium hydroxide solution. The organic phase is separated off and treated with 5% acetic acid. This acid carries basic substances into the aqueous phase; this aqueous phase is separated off and evaporated to yield a semi-crystalline precipitate which constitutes fraction $I_4$.

Thus, the purified antibiotic contains two components in a crystalline form (fractions $I_3$ and $I_4$). The characteristics of these crystalline fractions are given below.

Fraction $I_3$.—Physical characteristics: slightly beige crystals; melting point 155–156° C.; optical rotation $\alpha_D = -46°$.

Spectral study: The infrared spectrum is shown in FIG. 3 of the attached drawing where the lower abscissae are wave numbers in cm.$^{-1}$, the upper abscissae are wavelengths in microns and the ordinates are percent transmission. There are characteristic bands of OH, NH, —CO—O— and —CO—NH— groups and bonds.

Chromatographic study.—Aminoacids: two-dimensional chromatography of the hydrolysis product shows 4 spots, two of which have been identified as glycine and threonine. The two others, on cellulose and with the solvent systems butanol-acetic acid-water, 12:3:5, and ethyl acetate-pyridine-acetic acid-water, 5:5:1:3, respectively show $R_f$ values of 0.26 and 0.29 for one and of 0.32 and 0.33 for the other.

Polar acids: hydroxy acids, hydroxy dicarboxylic acids having a carbon chain of 4 to 6 carbon atoms. $R_4$ tartaric acid=0.75 (on cellulose with the solvent system butanol-acetic acid-water, 12:3:5), and an unidentified polar acid which does not react with ninhydrin.

Fraction $I_2$ is thus a peptide-ester or depsipeptide of low molecular weight; the product volatilises at a temperature of 280–300° C. without decomposition.

Fraction $I_4$.—Semi-crystalline substance, ninhydrin-positive, soluble in dilute acetic acid. On a cellulose plate, using the solvent system butanol-acetic acid-water, 12:3:5, its $R_f$ is 0.35.

Aminoacids (identified by two-dimensional chromatography): leucine, iso-leucine, valine, proline, serine, glycine, aspartic acid, arginine and lysine; and three unidentified acids.

Fraction $I_4$ is a mixture or a complex of di-peptide and partly depsi-peptide character, because peptide bonds and ester bonds alternate.

Properties common to fractions $I_3$ and $I_4$: soluble in ethanol and methanol, insoluble in hexane, slight solubility in chloroform. They are mixtures of oligopeptides, depsipeptides and cyclopeptides.

Activity of the antibiotic extracted from *Pseudomonas rollandi*.—The activity of the new antibiotic was demonstrated by its ability to inhibit the growth of a strain of *Staphylococcus aureus* originating from the Institut Pasteur collection. The growth inhibition tests on the pathogenic strain are carried out as follows:

Two identical Petri dishes containing nutrient agar are inoculated over their entire surface with a suspension of Staphylococci obtained by introducing a loop of an 18 hour culture broth into 10 ml. of sterile water. One of the dishes serves for comparison purposes whilst the fractions to be tested, imbibed in discs of sterile filter paper, are placed on the other. After about 16 to 18 hours' incubation in an oven at 37° C., well-separated colonies covering the entire surface of the comparison dish are obtained. According to this test, an antibiotic substance is regarded to be very active if the inhibition zone, which is devoid of pathogenic organisms, is larger than 5 mm. around the filter paper disc, as active if the inhibition zone is 5 mm. around the filter paper disc, and as slightly active if this inhibition zone is less than 5 mm.

The results of these tests are given in Table III below.

TABLE III

| Product tested: | Activity |
|---|---|
| Methanolic extract | + |
| Semi-pudified extract I | ++ |
| Fraction $I_1$ | + |
| Fraction $I_2$ | + |
| Fraction $I_{11}$ | ++ |
| Fraction $I_{22}$ | ++ |

NOTE: + active, inhibition zone 5 mm.; ++ very active, inhibition zone greater than 5 mm.

Table IV, below, shows the antibiotic spectrum of the active fractions towards various organisms some of which are Gram-positive and some of which are Gram-negative.

The results obtained show that the purified fractions of the new antibiotic are active against a variety of organisms. The active doses vary from 0.5 to 0.06 mg.

TABLE IV.—ACTIVE FRACTIONS

| Organism | Gram | $I_{11}$ | $I_{22}$ | $I_3$ |
|---|---|---|---|---|
| Bac. anthracis | + | ± | ± | |
| Brucella abortus | − | | − | ± |
| Bac. brevis | − | − | ± | − |
| Bac. megatherium | + | − | + | − |
| Bac. subtilis | + | − | ± | − |
| Corynebact. diphteriae | + | + | − | ± |
| Corynebact. pseudo | | | | |
| Corynebact. diphteriae | + | ± | − | ± |
| Corynebact. xerosis | − | ± | + | ± |
| Diplococcus pneumoniae | + | − | ± | − |
| Klebsiella pneumoniae | − | ± | ± | − |
| Mycobact. tuberculosis | + | ++ | ++ | ++ |
| Neisseria catarhalis | − | + | ± | − |
| Proteus valgaris | − | + | ± | − |
| Salmonella enteriditis | − | | − | + |
| Salmonella baratyphi | − | ± | + | − |
| Salmonella typhi | − | | ++ | + |
| Shigella paradysent | − | ± | − | |
| Staphylococcus aureus | + | + | ++ | − |
| Streptococcus faecalis | + | − | ± | − |
| Streptoc. pyogenes | + | | ± | |

Acute toxicity was determined on the methanolic extract which forms the crude antibiotic. A graduated dose of methanolic extract of 0.005 to 4 g./kg. was injected intraperitoneally into batches of 10 mice weighing about 15 g. The results are reported in Table V below. The degree of mortality is nil up to a dose of 2 g./kg. The $LD_{50}$ is 2.8 g./kg.

TABLE V

| No. of batch of mice: | Dose injected in g./kg. | Mortality in percent |
|---|---|---|
| 1 | 0.005 | 0 |
| 2 | 0.05 | 0 |
| 3 | 0.10 | 0 |
| 4 | 0.25 | 0 |
| 5 | 0.5 | 0 |
| 6 | 0.75 | 0 |
| 7 | 1.00 | 0 |
| 8 | 1.25 | 0 |
| 9 | 1.5 | 0 |
| 10 | 2.0 | 0 |
| 11 | 2.5 | 9 |
| 12 | 2.75 | 40 |
| 13 | 3 | 70 |
| 14 | 4 | 100 |

We claim:

1. A process for producing an antibiotic wherein a strain of *Pseudomonas rollandi* CBS 368.68 is cultured aerobically at 12–42° C., in a culture medium, for a sufficient period to achieve the stationary growth phase of the Pseudomonas, and the resulting Pseudomonas is then separated and ground, the resulting ground material is dehydrated, and the resulting anhydrous ground Pseudomonas extracted with methanol to give a methanolic solution of the crude antibiotic.

2. A process according to claim 1 wherein the methanolic solution is taken to dryness to give the antibiotic as a solid methanolic extract.

3. A process according to claim 1 wherein the Pseudomonas is cultured aerobically at 28–37° C.

4. A process according to claim 1 wherein the Pseudomonas is cultured in a nutrient broth.

5. A process according to claim 1 wherein after the stationary growth phase has been achieved, the resulting Pseudomonas is separated by centrifugation or ultrafiltration.

6. A process according to claim 1 wherein the separated Pseudomonas is ground by treatment with ultrasonics.

7. A process according to claim 1 wherein the ground Pseudomonas is dehydrated by lyophilisation.

8. A process according to claim 2 wherein the methanolic extract is extracted with a chlorinated solvent followed by or preceded by a treatment with hexane or heptane to remove lipids, so as to purify the antibiotic further.

9. A process according to claim 8 wherein the chlorinated solvent is chloroform, methylene chloride or trichloroacetic acid.

10. A process according to claim 8 wherein the further purified antibiotic is extracted with ethanol to give a dry extract of still further purified antibiotic.

11. An antibiotic extracted from *Pseudomonas rollandi* CBS 368.68, containing:
 (a) a peptide-ester of a depsi-peptide component of low molecular weight which can be isolated as slightly beige crystals, M.P. 155–156° C., $\alpha_D = -46°$, and having an infrared spectrum showing characteristic absorption bands of the groups OH, NH, —CO—O— and —CO—NH—; and
 (b) a second component which is a mixture or complex of dipeptide and in part depsi-peptitde character, which can be isolated in a semi-crystalline, ninhydrin-positive form, which is soluble in dilute acetic acid and has an $R_f$ of 0.35 on a cellulose plate when using the solvent system butanol-acetic acid-water, 12:3:5.

12. A pharmaceutical composition comprising an antibiotic according to claim 11, and a non-toxic pharmaceutically acceptable excipient.

References Cited

UNITED STATES PATENTS 3,597,325   8/1971   Arima et al. ——————— 195—96

ALVIN E. TANENHOLTZ, Primary Examiner

U.S. Cl. X.R.

195—96